United States Patent [19]

Flowerday

[11] Patent Number: 4,652,982
[45] Date of Patent: Mar. 24, 1987

[54] ILLUMINATED VANITY MIRROR ASSEMBLY

[75] Inventor: Carl W. Flowerday, Holland, Mich.

[73] Assignee: Prince Corporation, Holland, Mich.

[21] Appl. No.: 814,416

[22] Filed: Dec. 30, 1985

[51] Int. Cl.⁴ .............................................. F21V 33/00
[52] U.S. Cl. .................................... 362/135; 362/140; 362/136; 296/97 H
[58] Field of Search ............... 362/135, 136, 137, 140, 362/144, 155, 204, 295; 296/97 H, 97 B, 37.8, 97 R; 224/312; 49/177

[56] References Cited

U.S. PATENT DOCUMENTS

| | | | |
|---|---|---|---|
| 2,635,612 | 4/1953 | Dean | 362/136 |
| 4,000,404 | 12/1976 | Marcus | 362/135 |
| 4,203,149 | 5/1980 | Viertel et al. | 362/144 |
| 4,227,241 | 10/1980 | Marcus | 362/140 |
| 4,241,383 | 12/1980 | Shea | 362/135 |
| 4,333,128 | 6/1982 | Moore | 362/135 |
| 4,421,355 | 12/1983 | Marcus | 296/97 H |
| 4,491,899 | 1/1985 | Fleming | 362/135 |
| 4,521,051 | 6/1985 | Cody et al. | 296/97 H |

FOREIGN PATENT DOCUMENTS 904743 2/1954 Fed. Rep. of Germany ...... 362/135
3222194A1 12/1982 Fed. Rep. of Germany ... 296/97 H Primary Examiner—Raymond A. Nelli
Attorney, Agent, or Firm—Price, Heneveld, Cooper, DeWitt & Litton

[57] ABSTRACT

An illuminated vanity mirror package includes guide and support members which allow the package to translate and rotate to a variety of use positions. In a preferred embodiment, the package is mounted within a recess of a vehicle visor and can be reversed between flush-mounted stored and use positions as well as intermediate use positions.

26 Claims, 8 Drawing Figures

ILLUMINATED VANITY MIRROR ASSEMBLY

BACKGROUND OF THE INVENTION

The present invention pertains to an illuminated vanity mirror assembly adapted for use in a vehicle and particularly to one which is pivotally mounted to an axle which in turn is slidable between guide and support means which can be mounted to a visor body.

Illuminated vanity mirror packages for use in vehicle visores have become a popular vehicle accessory. U.S. Pat. No. 4,227,241 illustrates a covered illuminated vanity mirror assembly which has become standard or optional equipment on many automobiles. Such visor construction incorporates a fixed illuminated vanity mirror assembly including a cover which is pivotally mounted for selectively enclosing the vanity mirror and actuating the lights associated with the mirror. The cover provides protection when the vanity mirror is not in use and shading of the eyes when the assembly is employed as a map reading lamp.

In recent years, other vanity mirror visor constructions have been proposed. U.S. Pat. No. 4,521,051, for example, discloses a vanity mirror assembly which, in one embodiment, pivots and slides between a pair of tracks on a vertical axis such that the mirror can be flipped over between use positions, exposing the mirror, and a non-use position, in which the mirror faces inwardly toward the visor body. German Offenlegungsschrift 32 22 194 discloses an illuminated vanity mirror visor in which a light is mounted to the top edge of the visor body, and a mirror is pivoted on a fixed horizontally extending axis for pivoting the mirror downwardly below the visor for use. U.S. Pat. No. 4,541,663 correspondes to the published German patent application.

U.S. Pat. No. 4,421,355 disloses another visor construction in which, in one embodiment, mirrors are positioned on the inside of a pair of opposed vertically pivoted doors which open to expose a centrally mounted illuminated mirror as well as mirrors mounted to the inner door panels. U.S. Pat. No. 4,486,819 discloses a visor having a slide-out illuminated mirror assembly which extends from the lower edge of the visor and which can be pivoted to selected positions once extended from the visor body.

SUMMARY OF THE PRESENT INVENTION

The system of the present invention provides a significant conceptual departure from the prior art by providing an illuminated vanity mirror assembly adapted for mounting to a vehicle and, in the preferred embodiment, to a visor body. The system of the present invention includes a pair of guide and support means between which there is mounted a controlled sliding pivot axle which cooperates with the guide and support means and is pivoted along an axis orthogonal to the sliding movement of the axle. Mounted to the axle is an illuminated vanity mirror package including a mirror having a lighting means therefor such that, when the guide and support means are mounted within a recess in a visor body, the illuminated vanity mirror package can be pivoted from a stored non-use position, flush with the visor body, to expose a covered surface corresponding, in the preferred embodiment, to the visor covering, and pivoted outwardly to a plurality of use positions. This permits the illuminated vanity mirror to be used both as a makeup mirror or as a map reading lamp in conjunction with the pivoted adjustment of the visor itself. In a position reversed from the stored position, the illuminated vanity mirror package is inserted in the visor recess such that the mirror and lighting means therefor are substantially flush with the outer surface of the visor in a position rotated approximately 180° from the stored non-use position.

In a preferred embodiment of the invention, a visor is provided with a recess for receiving the adjustable flip-over illuminated vanity mirror package. The package includes a panel having a mirror on one side and lighting means adjacent the mirror for providing illumination for the use of the mirror. The panel includes axle means coupled to and extending from opposite sides of the panel for engaging edges of the recess such that the panel can be pivoted about the axle which slides within guide and support means extending along the edges of the recess. The illuminated vanity mirror package can be reversed for exposing either the illuminated vanity mirror or the opposite side of the panel. Electrical slide contacts are provided and engage the axle to supply operating power to the package.

Such construction provides an illuminated vanity mirror package with a clean, flush appearance when in the stored non-use position and a variety of use positions. These and other features, objects and advantages of the present invention will be apparent upon reading the following description thereof together with reference to the accompanying drawings in which:

DETAILED DESCRIPTION OF THE PREFERRED EMBODIMENT

Figure 1:
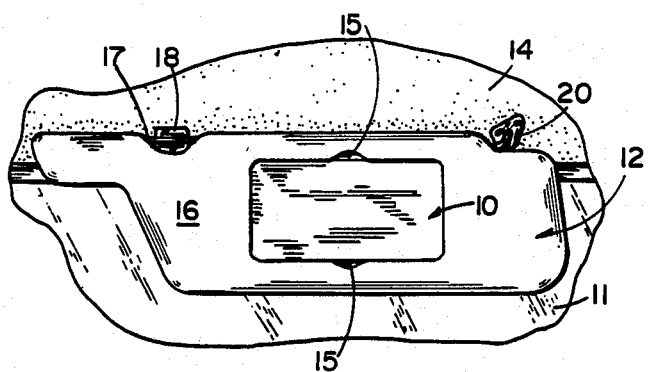
FIG. 1 is a front elevational view of an illuminated vanity mirror assembly of the present invention shown installed in a lowered vehicle visor and in a stored position.
Figure 3:
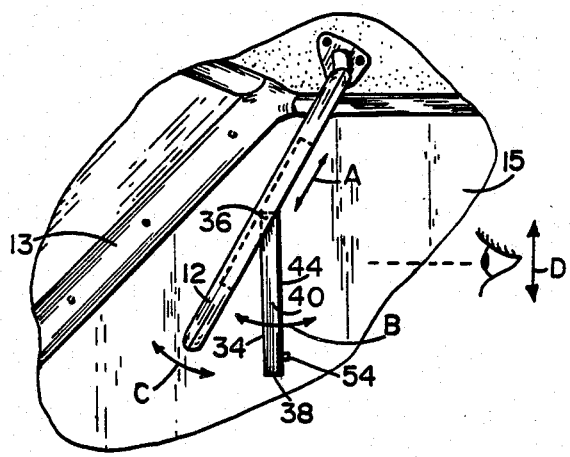
FIG. 3 is a left side elevational view of the structure shown in FIG. 2.

Referring initially to FIGS. 1-4, there is shown an illuminated vanity mirror assembly 10 which is mounted, in the preferred embodiment, in a visor 12, in turn mounted to the roof 14 of a vehicle such as an automobile. Shown in the figures is the passenger-side visor 12 which is mounted adjacent the right side of the windshield 11 of the vehicle near the right "A" pillar 13 and adjacent the right side window 15 (FIG. 3). The visor is preferably of a "clamshell" construction in which a visor core is made of a two-piece polymeric shell joined by an integrally-formed molded hinge. The visor core construction can be of the type disclosed in U.S. Pat. No. 3,926,470. The visor is covered by a suitable upholstery material 16 and is mounted to the vehicle by a pair of mounting brackets 18 and 20 with mounting bracket 20 being a pivot rod mounting bracket allowing the visor to be moved from the front window as illustrated, to a side window if desired, with the remote end support rod 17 releasably held by the open clip-type bracket 18 for such purpose. The upper edge of the visor is mounted to bracket 20 by a pivot rod and torque device which can be of the type disclosed in U.S. Pat. No. 4,500,131. The core 22 (FIG. 5) of visor 12 includes a generally rectangular recess 24 for receiving the illuminated vanity mirror package or assembly 10 and the associated guide and support means 70 which permits the package to be moved from a flush stored position as shown in FIG. 1, to a variety of intermediate positions between the stored position and a reversed flush use position shown in FIG. 4, in which the illuminated vanity mirror package faces outwardly for use.

The illuminated vanity mirror package 10 comprises a housing 30 having a front panel 32, a removable rear panel 34, upper and lower walls 36 and 38, and left and right side walls 40 and 42 respectively, thereby defining a shallow rectangular housing having an opening 33 in front wall 32 defining a frame for receiving and holding a rectangular vanity mirror 44. Adjacent opposite edges of mirror 44 are mounted lenses 46 and 48 behind which there are placed pairs of bright- and dim-level light bulbs 50 and 52 respectively (FIG. 8), to which power is selectively supplied as described below, for providing light directed outwardly and convergingly toward the center of the mirror for illuminating the face of the user. In the preferred embodiment of the invention, lenses 46 and 48 were Frensel-type lenses keyed to apertures formed in panel 32 to be snap-fitted and properly aligned for directing light outwardly and in a converging manner from the plane of housing 30.

Mounted to the side wall 42 of housing 30 is a bright-dim slide switch 51 (FIGS. 2 and 8) which can be used to selectively supply operating power to the bright-level bulbs 52 if a higher level of illumination is desired. The mirror 44 has a foam-cushioning material attached thereto by a bonding adhesive to provide both protection against breakage of the mirror during assembly and use as well as holding the mirror fragments in place should it become broken in an accident. Mounted to the front panel 32 of housing 30 is a push-button S.P.S.T. electrical switch 54 (FIGS. 2-4 and 8) which is normally off when depressed and on when released. This switch, when the housing 30 is in a closed position as illustrated in FIG. 1, engages the rear wall 25 of recess 24, thereby depressing the switch to move it to an open position preventing the application of electrical power to any of the lights 50 or 52. When the illuminated vanity mirror package is pivoted from the stored closed position illustrated in FIG. 1, however, the plunger of the spring-loaded push-button switch 54 is permitted to move outwardly from the depressed open position to an electrically closed position for supplying power to the lights as described in greater detail below in connection with FIG. 8.

Figure 5:
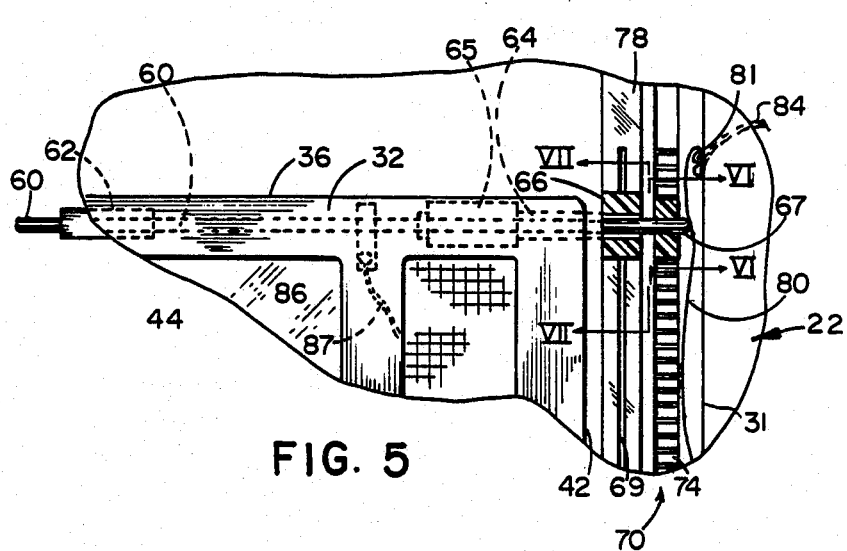
FIG. 5 is an enlarged fragmentary cross-sectional view of a portion of the housing and the guide and support mechanism for the illuminated vanity mirror assembly of the present invention.

Extending from the interior of the housing 30 through the side walls 40 and 42 of housing 30 near the top wall 36 is a pair of axially aligned, electrically conductive pivot axle segments 60 which are joined by an insulated coupling 62 (FIG. 5) such that the two axle segments rotate together and can be employed for providing electrical power to the light bulbs in the mirror package. FIG. 5 shows the upper right corner of the mirror package and its guide and support means which can be mounted within the visor body, it being understood that the left side is symmetrical and substantially identical and unnecessary to show. Each of the axles 60 are knurled at an end which is integrally molded to the insulated coupling 62 such that both the axles 60 and coupling 62 rotate as an integral unit, although the conductive axles 60 are electrically isolated from one another.

Each axle segment is rotatably supported by a bushing 64 which in turn is anchored at its end, extending from housing 30, by a slide member 66 and within the housing 30 by means of a torque fitting 65. The end of each of the cylindrical bushings 64 is knurled and the slides 66 integrally molded thereon to prevent rotation of the bushing with respect to the slide. The torque fitting 65, on the other hand, is also molded to the bushing, however allows a predetermined rotational torque between each of the torque fittings 65 and associated respective bushing 64 with the rear panel 34 of housing 30 being secured to each of the pair of symmetrically located torque fittings 65 and to the front panel 32 such that the housing 30 can be pivoted about axle sections 60 as the torque fittings 65 rotate with respect to the bushings 64. The side walls 40 and 42 include suitable apertures to allow bushings 64 to freely rotate with respect to the housing. The torque fittings 65 can be molded to the bushings in a manner taught by U.S. Pat. No. 4,352,518 and provides a predetermined torque for holding housing 30 in a selected rotated position.

Figure 6:
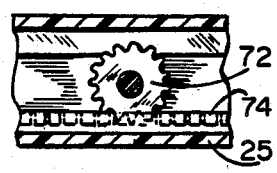
FIG. 6 is a fragmentary cross-sectional view taken along section line VI—VI of FIG. 5.
Figure 7:
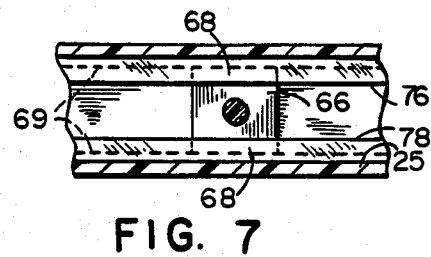
FIG. 7 is an enlarged fragmentary cross-sectional view taken along section line VII—VII of FIG. 5.

The illuminated vanity mirror package 10 is guidably supported in the preferred embodiment within a visor by means of the guide and support means 70, as best seen in FIGS. 5-7. It is noted that each of the sides of the package are so supported with only the right side being illustrated in these drawing figures. Near the extending end of each of the axle segments 60 there is mounted a gear 72 which is molded to a knurled section of axle 60 adjacent its tip 67. Each gear 72 rides in a rack 74 which in turn is secured to the rear surface 25 of the visor core by suitable bonding. The opposite side includes similar structure such that the illuminated vanity mirror package 10 can be slid upwardly and downwardly within the recess 24 of the visor body in a direction indicated by arrow A in FIG. 3, with the gear and rack combination 70 and 74 preventing undesirable skewing of the illuminated vanity mirror package.

The guide and support means 70 also includes the pair of slides 66 which include upper and lower tabs 68 which fit within slots 69 formed in upper and lower guide tracks 76 and 78 which extend in longitudinal parallel relationship to the gear rack 74 in inwardly spaced relationship thereto. The tracks and slides hold the axle segments 60 and gears 72 mounted thereto downwardly on the racks 74 and provide additional guiding support for the illuminated vanity mirror package.

With this structure, therefore, the illuminated vanity mirror package is free to translate in a generally vertical direction as indicated by arrow A along the minor axis of the visor body by the rotation of the axle and movement of the gear and rack structure on opposite edges of the illuminated vanity mirror package. Similarly, the illuminated vanity mirror package 10 is free to rotate about the pivot axle 60 by the mounting of the housing 30 to the bushing 64 through torque fitting 65 which permits the package to be adjusted at any relative pivoted position with respect to the axles 60 as illustrated by arrow B in FIG. 3. These adjustments, plus the pivoted adjustment of the visor body 12 itself about the pivot axle associated with elbow assembly 20, as illustrated by arrow C in FIG. 3, permits a wide variety of adjustments of the mirror 44 and light means and the light emitting from lenses 46 and 48 for use of the system.

Figure 4:
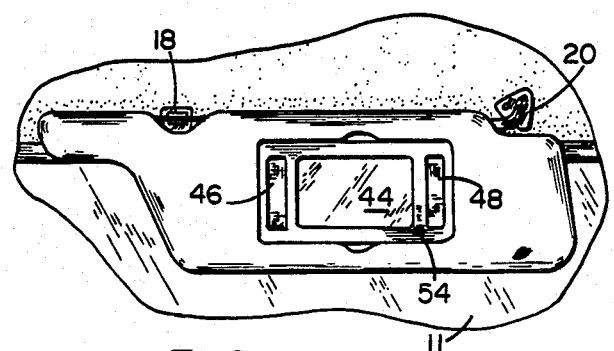
FIG. 4 is a front elevational view of the illuminated vanity mirror assembly shown in a position reversed from that shown in FIG. 1.
Figure 2:
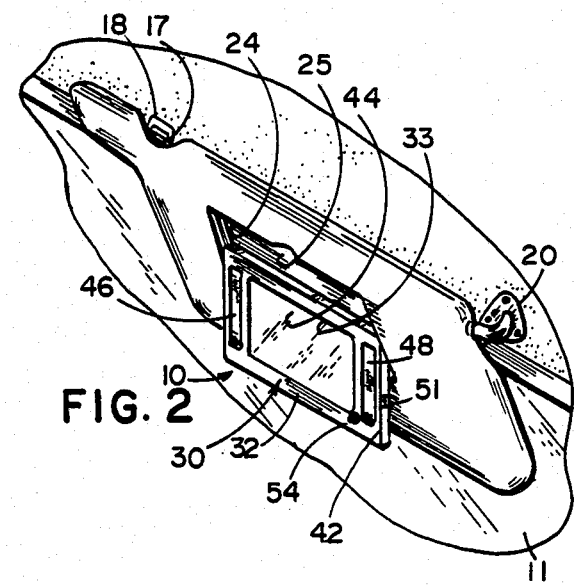
FIG. 2 is a perspective view of the assembly shown in FIG. 1 shown in one possible use position.

In, for example, FIGS. 2 and 3, the illuminated vanity mirror package 10 is shown in a position which can be used for viewing at eye level, as illustrated in FIG. 3, by an occupant. The translation and pivoting of the housing 30, however, permits the plane of the mirror 44 to remain generally vertical and yet be moved upwardly or downwardly, as indicated by arrow D in FIG. 3, such that the height of the mirror can be selected by an occupant to a desired usable level. The assembly can also be used as a map reading lamp and stored with the light and mirror assembly in an exposed position, as illustrated in FIG. 4, if desired. Thus, for example, with the illuminated vanity mirror package completely reversed, as seen in FIG. 4, from the closed stored position, shown in FIG. 1, the visor 12 can be pivoted forwardly toward the windshield 11, and the illumination means will direct light generally downwardly toward the lap of a user for use of the light therefrom as a map reading lamp or general interior vehicle light. In this position, naturally the axle segments 60 are moved toward the upper end of racks 74 such that the upper and lower walls 36 and 38 of the package fit between the upper and lower walls of recess 24 formed in the visor body. The visor body preferably includes a pair of recesses 15 to assist the user in grasping the illuminated vanity mirror package 10 to remove the package from the visor flush position stored within the visor body.

The tip 67 of each axle section 60 extends outwardly beyond gear 72 and is rounded to engage slide contacts 80 and 82 respectively (FIGS. 5 and 8) which are elongated, flat conductive members which are flexible and are secured to a side wall 31 of the visor core by a fastening means such as attachment screws 81 which also hold the terminals of electrical conductors 84 and 85 leading to the vehicle's electrical supply system through the hollow pivot elbow assembly 20. The tips 67 of the axle sections ride along respective contacts 80 and 82 through the travel limits of package 10 to supply each axle section with one of the two polarities of electrical operating power for selectively applying power to the lamps 50 and 52. Power is picked off of the axle sections 60 by spring electrical wiper contacts 86 secured to the rear panel 34 by conventional fastening means such as heat staking, and electrical conductors 87 couple the spring contacts 86 to the electrical circuit as illustrated in FIG. 8.

Figure 8:
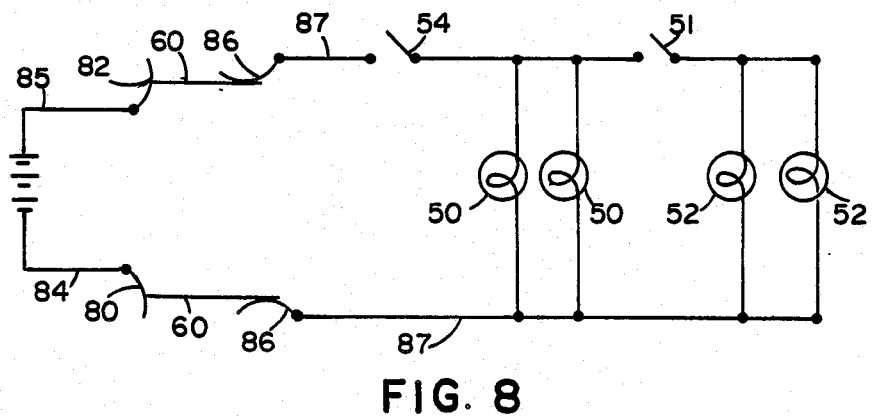
FIG. 8 is an electric circuit diagram in schematic form of the electrical circuit of the vanity mirror assembly.

The electrical circuit for the visor system is shown in FIG. 8 with the pair of conductors 84 and 85 extending from the vehicle's electrical power source represented by battery 90 through elbow 22 and coupled to electrical contacts 80 and 82. The axle sections 60 supply the electrical current through the spring-loaded contacts 86 which in turn are coupled by wires 87 to bulbs 50 and 52 through the push-button switch 54 and the bright-dim switch 51. With the push-button switch 54 in a closed position when the visor package is pivoted outwardly and downwardly from the stored position shown in FIG. 1, bulbs 50 will always be illuminated. To provide a higher intensity illumination, slide switch 51 mounted to side wall 42, as shown in FIG. 2, is closed to activate a pair of additional bulbs 52 with one of each of the bulbs being located behind each of the lenses 46 and 48. The electrical conductors, coupling the bulbs and the bulbs themselves, are mounted to the inside surface of the rear panel 34 of the housing. The housing is molded of a suitable polymeric material such as a polycarbonate, and the front and upper, lower and side walls are integral with the removable rear panel secured to the torque fittings 65 and to the front panel 32 by suitable fastening screws.

The illuminated vanity mirror package of the present invention can be mounted within a visor body as shown in the preferred embodiment described herein. In use, the user grasps the upper edge of the illuminated vanity mirror package, which corresponds to wall 38, through recess 15 (FIG. 1) and pivots the unit outwardly and downwardly to an intermediate position such as that illustrated in FIGS. 2 and 3. The device can be slid and pivoted along the guide and support means as desired for adjustment to a desired viewing position as illustrated in FIG. 3. Similarly, the illuminated vanity mirror package 10 can be mounted to other structural elements of the vehicle such as in the rear of the front seats or the rear of front seat headrests or the like by a similar guide and support means 70, as illustrated in FIG. 5, to provide use of the illuminated vanity mirror by rear seat passengers. Likewise, the illuminated vanity mirror package and associated guide and support means 70 could be mounted to a support platform which could be attached to existing visors by clips or the like, although the integration of the package within a recess formed in an original visor is preferred.

It will become apparent to those skilled in the art that various modifications to the preferred embodiment of the invention, as described herein, can be made without departing from the spirit or scope thereof as defined by the appended claims.

The embodiments of the invention in which an exclusive portion or privilege is claimed are defined as follows:

1. An illuminated mirror assembly for attachment to a vehicle, said assembly comprising:
   a housing including a mirror mounted on one side and lighting means mounted adjacent said mirror for providing illumination for use of said mirror, said housing including axle means coupled to and extending from opposite sides of said housing;
   guide and support means adapted for mounting to a vehicle and cooperatively receiving said axle means such that said housing can be pivoted about said axle means and said axle translated in a direction orthogonal to the pivot axis of said housing to reverse said housing for exposing either said illuminated mirror or an opposite side of said housing; and
   means for supplying operating power to said lighting means when said mirror is exposed for use wherein said axle means comprises a pair of axle sections each made of a conductive material and said supplying means includes wiper contact means coupled to each of said axle sections.

2. An illuminated mirror assembly for attachment to a vehicle, said assembly comprising:
   a housing including a mirror mounted on one side and lighting means mounted adjacent said mirror for providing illumination for use of said mirror, said housing including axle means coupled to and extending from opposite sides of said housing;

guide and support means adapted for mounting to a vehicle and cooperatively receiving said axle means such that said housing can be pivoted about said axle means and said axle translated in a direction orthogonal to the pivot axis of said housing to reverse said housing for exposing either said illuminated mirror or an opposite side of said housing wherein said axle means comprising a pair of axle sections each made of a conductive material and said supplying means is coupled to each of said sections and wherein said guide and support means includes a pair of toothed racks extending adjacent opposite edges of said housing in spaced relationship thereto, and gear means mounted near an end of each axle section for engaging a respective associated rack, and insulating means coupling said axle sections for simultaneous rotatation; and means for supplying operating power to said lighting means when said mirror is exposed for use.

3. The apparatus as defined in claim 2 wherein said guide and support means further includes a pair of tracks extending adjacent opposite edges of said housing in spaced relationship to said gear means, and a pair of slide means rotatably coupled to said housing coaxially with each of said axle sections and slidably mounted within a respective associated track.

4. The apparatus as defined in claim 3 and further including a bushing and a torque member extending between each of said slide means and said housing to permit said housing to be rotated and held in a selected position.

5. The apparatus as defined in claim 4 wherein each of said bushings are generally cylindrical and said axle sections extend coaxially through a respective associated bushing.

6. The apparatus as defined in claim 5 wherein said means for supplying operating power comprises a pair of conductors for coupling to the vehicle's electrical system and contact means coupled to said conductors and extending in the path of travel of said axle sections for coupling each of said conductors to a respective associated axle section.

7. The apparatus as defined in claim 6 wherein said supplying means further comprises a pair of spaced spring contact means coupled to said housing and engaging a respective associated axle section and a pair of conductors coupling said spring contact means to said lighting means.

8. The apparatus as defined in claim 7 wherein said lighting means comprises at least a pair of lamps mounted in said housing with a lamp adjacent each opposite side of said mirror.

9. The apparatus as defined in claim 8 and further including lens means mounted to said housing in front of each of said lamps for directing illumination therefrom outwardly and convergingly.

10. A vehicle visor and illuminated mirror assembly comprising:

a visor body having a recess formed therein for receiving a reversible illuminated vanity mirror package;

a housing including a panel having a mirror and lighting means adjacent said mirror mounted thereto for providing illumination for use of said mirror;

guide and support means for said housing, said guide and support means mounted to said visor and extending adjacent opposite sides of said housing;

coupling means extending from opposite sides of said housing for engaging said guide and support means, said coupling means and said guide and support means cooperating such that said housing can be pivoted about an axis spaced inwardly from the upper and lower edges of said visor body to reverse for exposing either said illuminated mirror or the opposite side of said housing, and translated in a direction orthogonal to the pivot axis; and means for selectively supplying operating power to said lighting means when said mirror is exposed for use.

11. The apparatus as defined in claim 10 wherein said coupling means includes axle means rotatably supported within said housing.

12. The apparatus as defined in claim 11 wherein said axle means comprising a pair of axle sections each made of a conductive material and said supplying means is coupled to each of said sections.

13. The apparatus as defined in claim 12 wherein said guide and support means includes a pair of toothed racks extending adjacent opposite edges of said housing in spaced relationship thereto, and gear means mounted near an end of each axle section for engaging a respective associated rack, and insulating means coupling said axle sections for simultaneous rotation.

14. The apparatus as defined in claim 13 wherein said guide and support means further includes a pair of tracks extending adjacent opposite edges of said housing in spaced relationship to said gear means, and a pair of slide means rotatably coupled to said housing coaxially with each of said axle sections and slidably mounted within a respective associated track.

15. The apparatus as defined in claim 14 and further including a bushing and a torque member extending between each of said slide means and said housing to permit said housing to be rotated and held in a selected position.

16. The apparatus as defined in claim 15 wherein each of said bushings are generally cylindrical and said axle sections extend coaxially through a respective associated bushing.

17. The apparatus as defined in claim 16 wherein said means for supplying operating power comprises a pair of conductors for coupling to the vehicle's electrical system and contact means coupled to said conductors and extending in the path of travel of said axle sections for coupling each of said conductors to a respective associated axle section.

18. The apparatus as defined in claim 17 wherein said supplying means further comprises a pair of spaced spring contact means coupled to said housing and engaging a respective associated axle section and a pair of conductors coupling said spring contact means to said lighting means.

19. The apparatus as defined in claim 18 wherein said lighting means comprises at least a pair of lamps mounted in said housing with a lamp adjacent each opposite side of said mirror.

20. The apparatus as defined in claim 19 and further including lens means mounted to said housing in front of each of said lamps for directing illumination therefrom outwardly and convergingly.

21. A vehicle visor having a reversible illuminated vanity mirror comprising:

a visor body having a rectangular recess formed therein;

a pair of toothed racks mounted in parallel spaced relationship within said visor body adjacent opposite edges of said recess;

a pair of slotted guide tracks mounted in parallel spaced relationship within said visor body adjacent opposite edges of said recess and spaced in parallel relationship with said racks;

a housing shaped to fit within said recess and including a mirror on one side, said housing further including lighting means for said mirror;

an axle rotatably extending through said housing and having gears positioned thereon and aligned to travel on said racks while rotating said axle;

bushing means coaxially surrounding said axle and having slide means mounted to ends of said bushing means which extend over said tracks, said slide means captively held in said track to hold said gears in engagement with said racks; and torque coupling means extending between said housing and said bushing means to allow said housing to rotate about said axle and be held in an adjusted rotated position and also allow said housing to be translated as said axle is moved along said racks.

22. The apparatus as defined in claim 21 wherein said axle comprises a pair of conductive axle sections joined by an insulating coupling.

23. The apparatus as defined in claim 22 and further including a pair of conductors for coupling to the vehicle's electrical system and contact means coupled to said conductors and extending in the path of travel of said axle sections for coupling each of said conductors to a respective associated axle section.

24. The apparatus as defined in claim 23 wherein said supplying means further comprises a pair of spaced spring contact means coupled to said housing and engaging a respective associated axle section and a pair of conductors coupling said spring contact means to said lighting means.

25. The apparatus as defined in claim 24 wherein said lighting means comprises at least a pair of lamps mounted in said housihg with a lamp adjacent each opposite side of said mirror.

26. The apparatus as defined in claim 25 and further including lens means mounted to said housing in front of each of said lamps for directing illumination therefrom outwardly and convergingly.

* * * * *